Sept. 22, 1953  R. D. WEHR  2,652,769
APPARATUS FOR EXTRACTING JUICE FROM CITRUS FRUITS
Filed July 20, 1951  4 Sheets-Sheet 1
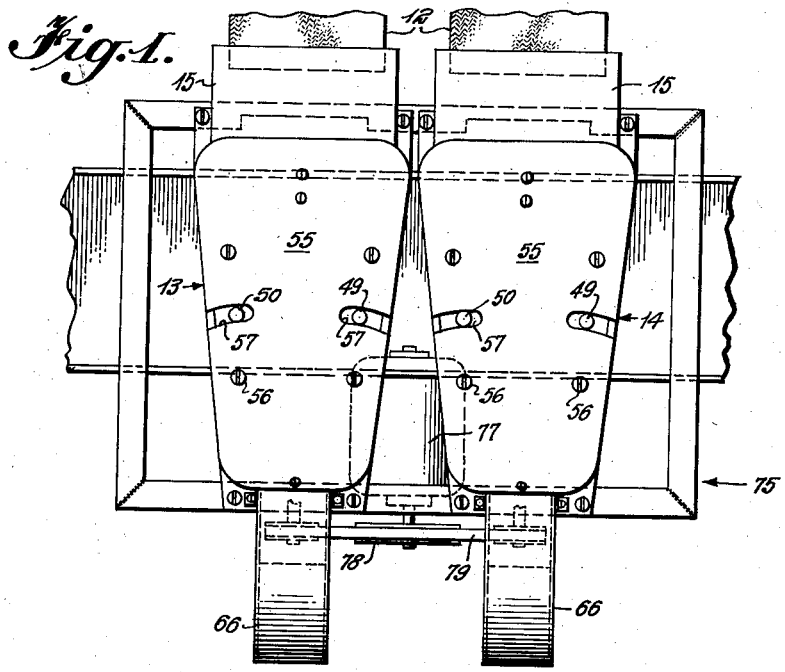
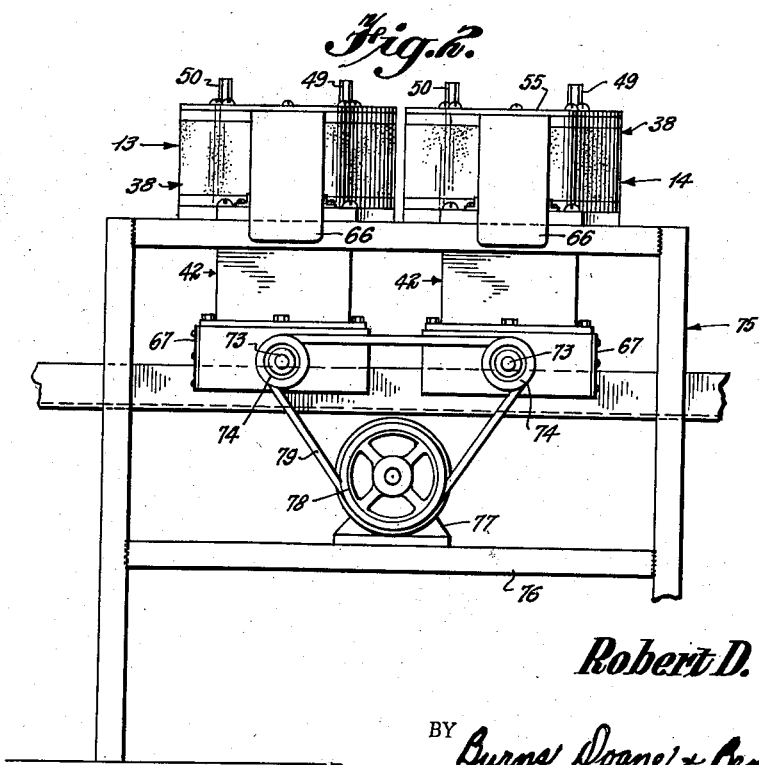
INVENTOR
Robert D. Wehr
BY Burns, Doane & Benedict
ATTORNEYS

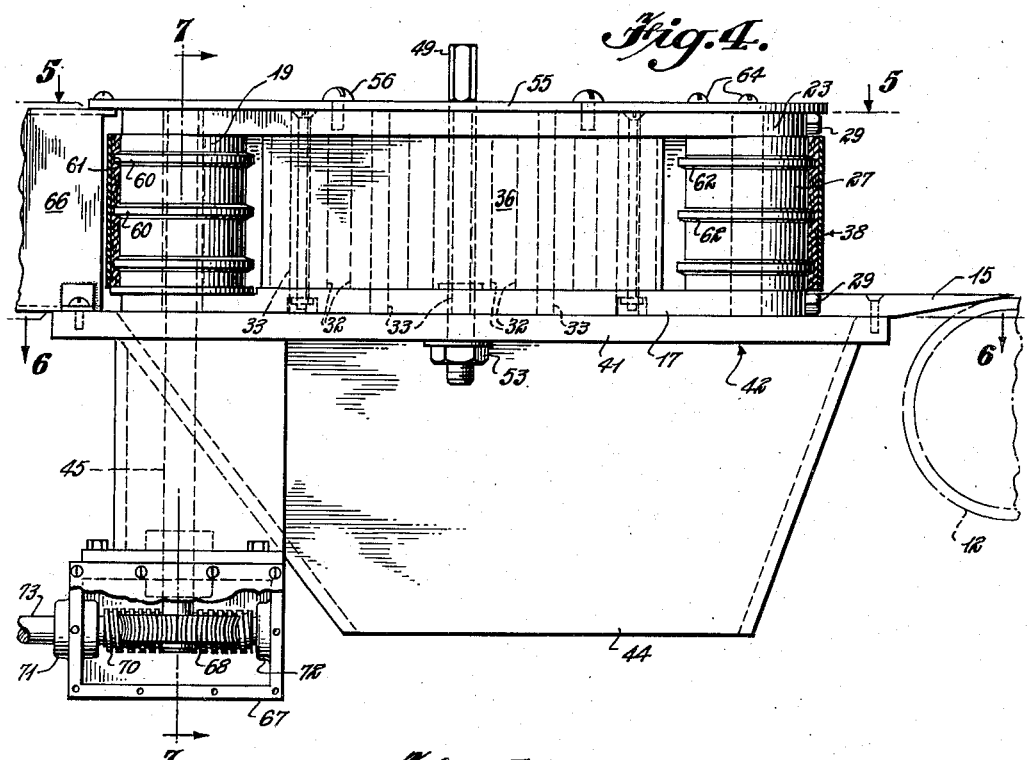

INVENTOR
Robert D. Wehr
BY Burns, Doane & Benedict
ATTORNEYS

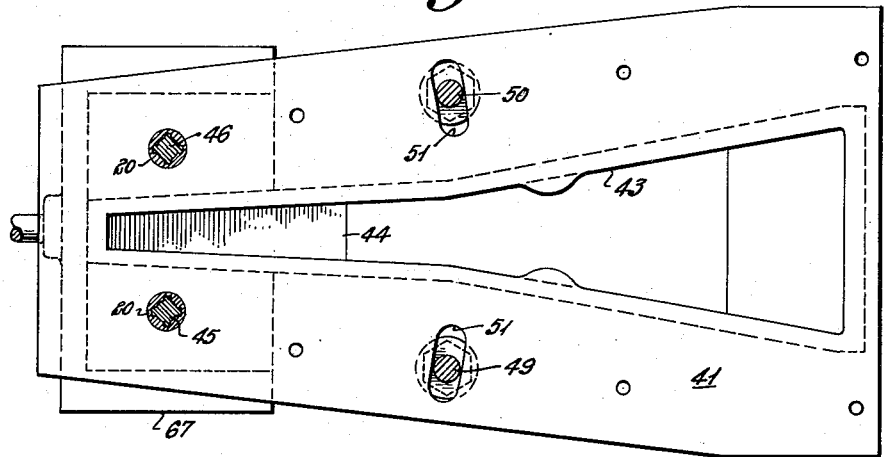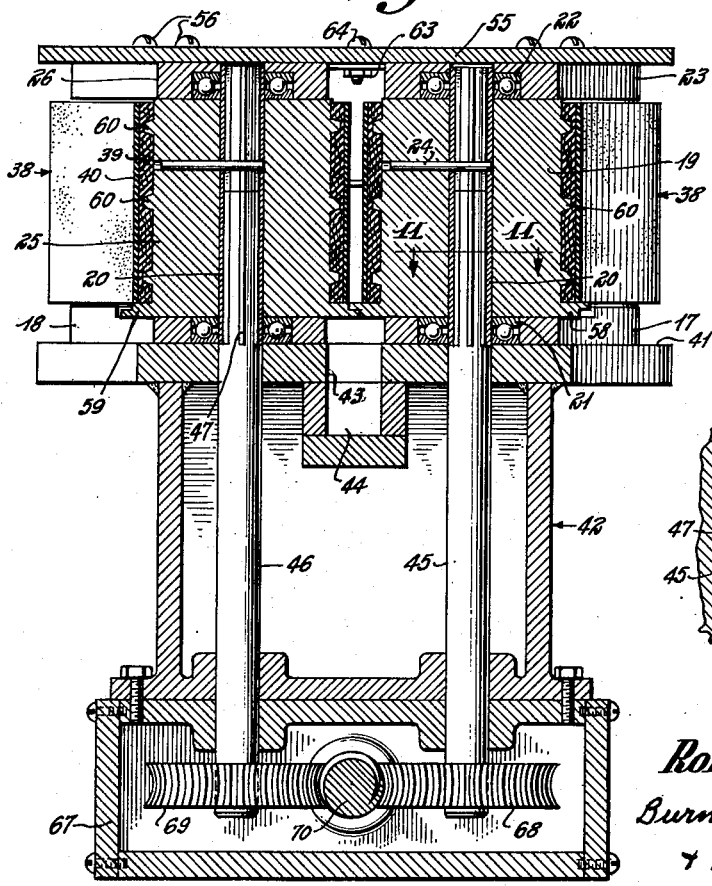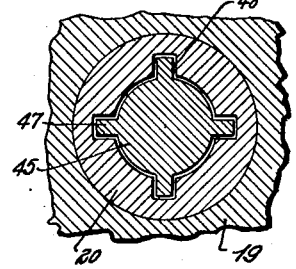

Patented Sept. 22, 1953

2,652,769

UNITED STATES PATENT OFFICE 2,652,769

APPARATUS FOR EXTRACTING JUICE FROM CITRUS FRUITS

Robert D. Wehr, Lakeland, Fla.

Application July 20, 1951, Serial No. 237,735

1 Claim. (Cl. 100—131)

The present invention relates to apparatus for rapidly and economically extracting juice from citrus fruits.

It is well known that the outer peel of citrus fruit contains oil which affects the flavor of the extracted juice and which adversely affects the keeping quality of the juice. It has been found that the peel oil in the juice must be maintained below about 0.030% in the juices from citrus fruit such as oranges, grapefruit, limes and lemons if the juice is to be palatable after being canned or frozen. The peel oil in juice from tangerines must be kept below about 0.0087% to prevent deterioration or unpalatability of the juice. It is also known that the juice must be extracted in a manner which will prevent contamination of the juice with impurities which would increase the likelihood of spoilage or decrease the purity of the juice. On the other hand it is essential for commercial success that the juice extracting equipment be capable of rapidly handling large quantities of fruit without requiring large monetary investments.

It is the primary object of my invention to provide citrus juice extracting equipment which is simple and economical in construction, which will handle large quantities of fruit per unit of time and which will produce sanitary juice having oil content within the permissible limits. Another object of the invention is to provide citrus fruit juice extracting apparatus which requires very little plant space. Still another object of the invention is to provide citrus fruit juice extracting apparatus which is capable of being readily disassembled for thorough cleaning and sterilization. Other objects and advantages of my invention will be referred to in the following detailed description of an exemplary form of apparatus embodying my invention. This description has reference to the accompanying drawings, wherein:

Figure 1 is a top plan view of a pair of juice extracting units, each unit being designed to receive and extract juice from fruit halves;

Figure 2 is a rear elevational view of the apparatus shown in Figure 1;

Figure 3 is a fragmentary side elevational view of a hood at the peel exit end of one of the juice extracting units;

Figure 4 is a view partly in side elevation and partly in section of one of the juice extracting units illustrated in Figures 1 and 2;

Figure 5 is a sectional view taken in the direction of the arrows along the line 5—5 of Figure 4;

Figure 6 is a sectional view taken in the direction of the arrows along the line 6—6 of Figure 4;

Figure 7 is a sectional view taken in the direction of the arrows along the line 7—7 of Figure 4;

Figure 11 is an enlarged fragmentary sectional view taken in the direction of the arrows along the line 11—11 of Figure 7.

Figure 8:
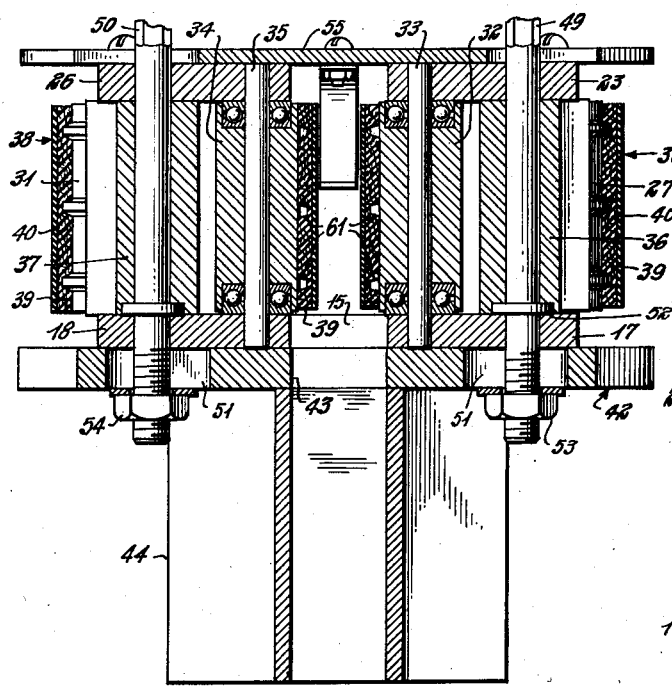
Figure 8 is a sectional view taken in the direction of the arrows along the line 8—8 of Figure 5.

The apparatus of this invention may be used in combination with any suitable apparatus for splitting the citrus fruit into halves and delivering the halves in proper relationship. One such apparatus is described and claimed in my copending application, Serial No. 233,987, filed June 28, 1951, now abandoned, entitled "Apparatus for Orienting and Splitting Fruit." The apparatus of that application orients and splits the fruit along their equators and delivers the half fruits along parallel belts with the cut faces of the fruit lying on the belts. Such parallel belts are illustrated in the drawings of this application and designated by the reference numeral 12. The parallel lines of fruit halves are delivered by the belts 12 to the juice extracting units which are designated generally by the reference numerals 13 and 14. The units 13 and 14 are identical, so for the purpose of further discussion it will be sufficient to describe only one of those units in detail.

The fruit halves are discharged from a belt 12 onto a ramp 15. The ramp 15 has slots 16 therein and this ramp extends between a pair of lower pulley supporting plates 17 and 18. A driving pulley 19 is mounted on a hollow shaft 20 which is received in an anti-friction bearing assembly 21 in the lower pulley supporting plate 17. The upper end of the hollow shaft 20 is received in a bearing assembly 22 mounted in an upper pulley receiving plate 23. The driving pulley 19 is keyed to the hollow shaft 20 by means of a pin 24. A similar driving pulley 25 is rotatably mounted between the lower pulley supporting plate 18 and an upper pulley supporting plate 26 by means comparable to the elements which have just been described, as will be apparent from Figure 7.

Figure 9:
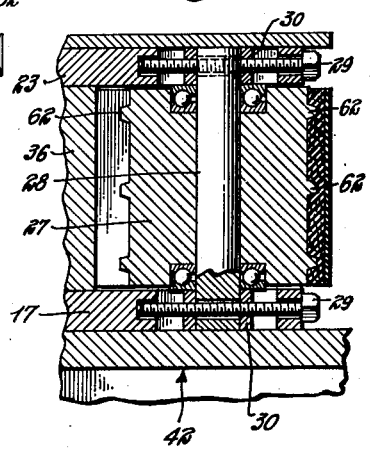
Figure 9 is a sectional view taken in the direction of the arrows along the line 9—9 of Figure 5.

A driven pulley 27 is rotatably mounted between the lower pulley supporting plate 17 and the upper pulley supporting plate 23, as is best illustrated in Figure 9. The driven pulley 27 is mounted by means of anti-friction bearing on a shaft 28. The shaft 28 is provided with adjusting screws 29 which cooperate with threaded collars 30 at the upper and lower ends of the shaft to permit adjustment of the position of the pulley 27 to control the tension in the belt hereinafter described. A driven pulley 31 similar to the driven pulley 27 is comparably mounted and positioned between the lower and upper pulley supporting plates 18 and 26.

A plurality of squeezer pulleys 32 are journaled by means of anti-friction bearings on shafts 33 which are mounted in and extend between the lower and upper pulley supporting plates 17 and 23. A plurality of similar squeezer pulleys 34 are mounted on shafts 35 which extend between the lower and upper pulley supporting plates 18 and 26. The pulley supporting plates 17 and 23 are mounted in vertically spaced relationship by means of a web 36. The pulley supporting plates 18 and 26 are maintained in vertically spaced relationship by means of a similar web 37.

The pulleys between each pair of upper and lower pulley supporting plates may be considered as constituting a set of pulleys. An endless belt of flexible material is positioned on each set of pulleys. The belts are designated generally by the reference numeral 38. The inner face of each belt is composed of flexible material such as rubber impregnated woven fabric 39 and the outer face 40 is composed of a fluid impervious flexible material such as rubber or synthetic rubber which is resistant to the action of the fluids and acids encountered in the citrus juices. The driving, driven and squeezer pulleys of each set are positioned as best illustrated in Figure 5 to cause adjacent runs of the belts 38 to define the lateral edges of a converging fruit squeezing zone.

The lower pulley receiving plates 17 and 18 rest upon the flat upper surface 41 of a base which is designated generally by the reference numeral 42. An opening 43 in the upper surface 41 of the base 42 conforms generally in shape to the fruit squeezing zone defined by the endless belts 38. The juice and pulp pressed from the fruit halves can thus pass through the openings or slots 16 in the ramp 15 and through the opening 43 into a juice receiving hopper 44 of any suitable configuration from which the juice and pulp may be led to appropriate apparatus for further processing.

A pair of vertical driving shafts 45 and 46 are fluted at their upper ends as indicated by the reference numeral 47. The fluted upper ends of these shafts are received within corresponding splines or keyways 48 in the interior of the hollow shafts 20, so that there are in effect splined connections between the vertical driving shafts and the driving pulleys. It will be seen that the lower pulley supporting plates 17 and 18 and their associated sets of pulleys and endless belts would be pivotally movable over the upper surface 41 of the base 42, with the vertical shafts 45 and 46 forming the pivotal axes. For the purpose of maintaining these assemblies in their desired positions relative to each other and relative to the base 42, I provide clamping bolts 49 and 50. The clamping bolt 49 extends through the upper pulley supporting plate 23, the web 36, the lower pulley supporting plate 17 and an arcuate slot 51 in the base 42. This clamping bolt is provided with an integral collar 52 above the lower pulley supporting plate 17 and a nut 53 beneath the arcuate slot 51. The lower pulley supporting plate 17 and its associated elements may thus be pivotally moved about the vertical shaft 45 and clamped in the desired position by the nut 53. Movement of the lower pulley supporting plate 18 and its associated elements may be similarly controlled by the clamping bolt 50 and its nut 54.

I provide a cover plate 55 which completely covers both pulley and belt assemblies. The cover plate is secured to the upper pulley supporting plates 23 and 26 by any suitable means such as screws 56. The cover plate is provided with arcuate slots 57 for the upper ends of the bolts 49 and 50.

One important feature of the invention resides in the stepped flanges at the lower ends of the driving pulleys 19 and 25. The stepped flange 58 on the driving pulley 19 is positioned immediately beneath the lower edge of the endless belt 38. The stepped flange 59 of the pulley 25 is similarly positioned. The steps on the periphery of the flanges 58 and 59 are complementary, as is best shown in Figure 7, and the stepped peripheries of these flanges function to shear pulp from the squeezed fruit halves upon exit of such halves from the apparatus. The pulp thus sheared drops through the opening 43 in the base 42 and is thus received in the hopper 44.

Another important feature of the invention resides in the character of the pulleys and belts which are used. The driving pulleys 19 and 25 have circumferential ridges 60 thereon and the pulley engaging faces of the belts 38 have longitudinally extending grooves 61 for reception of the ridges 60. The driven pulleys 27 and 31 are preferably also provided with circumferential ridges 62 positioned to coincide with the grooves 61 in the belts. However, the belt engaging surfaces of the squeezer pulleys 32 and 34 are smooth and cylindrical and these surfaces engage only the flexible material of the belts which lies between grooves 61. This arrangement permits a certain amount of resilient distortion of the belts relative to the squeezer rolls in the fruit squeezing zone. I have found that this limited distortion is of assistance in preventing the extraction of excessive oil from the peels of the fruit.

The pulley supporting plates and pulley and belt assemblies can be easily detached from the base 42 by simply removing the nuts 53 and 54. These assemblies can then be thoroughly cleaned and sterilized. This is an important advantage in that the bacteria count of the extracted juice can be kept at a minimum. The metallic portions of the apparatus are preferably formed of aluminum, stainless steel or other material which is not adversely affected by the fruit or the juice.

Figure 10:
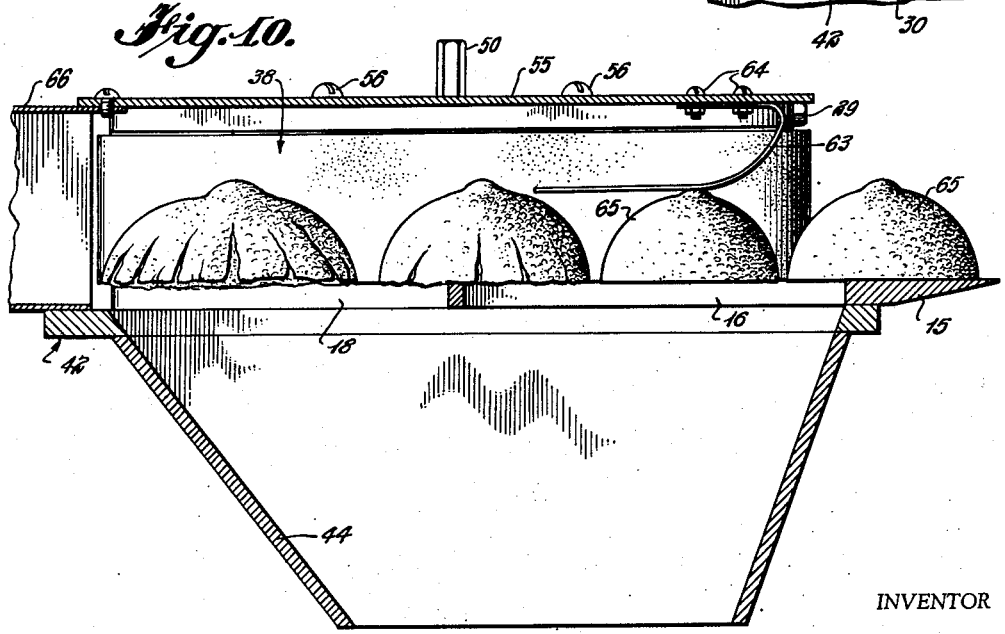
Figure 10 is a sectional view taken in the direction of the arrows along the line 10—10 of Figure 5.

I prefer to provide a spring member 63 which is secured to the lower surface of the cover plate 55 by means of bolts 64. As best seen in Figure 10, the spring member 63 is bowed and positioned to retain the fruit halves 65 in contact with the ramp 15 while those fruit halves enter the sharply converging portion of the squeezing zone.

Each juice extracting unit is provided with a hood 66 at the exist end of the squeezing zone for the purpose of deflecting the squeezed fruit halves downwardly into a suitable chute or receptacle.

The vertical shafts 45 and 46 extend downwardly into a gear housing 67. A worm wheel 68 is secured to the shaft 45 and a similar worm wheel is secured to the lower end of the shaft 46. The worm wheels 68 and 69 are driven by a common worm 70 which is journaled in bearings 71 and 72 in the gear housing 67. The worm 70 is integral with the horizontal shaft 73 which is provided with a drive pulley 74.

The juice extracting units 13 and 14 with their bases 42 are secured to and supported by a stand 75. The stand is provided with a shelf 76 which supports an electric motor 77 having a pulley 78. A belt 79 runs over the pulley 78 and the pulley 74 on each of the shafts 73 of the juice extracting units 13 and 14. Both the juice extracting units are thus driven at the same speed by means of a single motor. I have found that the speed of operation of the apparatus is important and somewhat critical. I have obtained the best results by operating the apparatus at such speed that the endless belts 38 have a linear speed of approximately 390 ft. per minute. Satisfactory results can be obtained with a linear speed of the belts of between 350 and 400 ft. per minute.

It will be seen by reference to Figure 5 that the fruit squeezing zone defined by the opposed runs of the belts 38 converges rather sharply for a portion of its length, then converges more gradually to the exit end of the zone. The lateral width of the squeezing zone between the pulleys 27 and 34 should be approximately equal to the diameter of the fruit being squeezed. This dimension can be appropriately adjusted in the manner described above. The lateral width of the squeezing zone between the driving pulleys 18 and 35 should be approximately $3\frac{3}{2}$ inches.

I have found the units 13 and 14 capable of extracting juice from fruit halves as rapidly as the fruit can be oriented and split by the apparatus of my above-mentioned application, Serial No. 233,987. I have successfully extracted juice from as many as 360 boxes of oranges per hour with the apparatus of this invention, and I have ascertained that the peel oil in the extracted juice is well within the permissible limits.

I have illustrated and described what I now consider to be the preferred embodiment of my invention. However, it will be apparent that various modifications and alterations may be resorted to without departing from the broader scope of the invention as defined by the following claim.

Having thus described my invention, I claim:

Apparatus for extracting juice from citrus fruit comprising a base having a juice receiving opening therein, upper and lower parallel pulley supporting plates on said base on opposite sides of said opening, a set of pulleys mounted between each pair of upper and lower plates and journaled therein for rotation, an endless belt on each set of pulleys, said pulleys of each set being positioned to cause adjacent runs of said belts to define the lateral edges of a converging squeezing zone overlying said opening, the pulley of each set at the narrower end of said squeezing zone constituting a driving pulley and being fixedly mounted on a hollow shaft, a pair of parallel driving shafts extending upwardly from said base through the lower of said plates and into splined driving engagement with the hollow shafts of said driving pulleys, said plates being pivotally adjustable about said driving shafts to vary the lateral dimensions of said squeezing zone, and means for releasably securing said pairs of plates to said base whereby said plate, pulley and belt assemblies are bodily removable from said base and said driving shafts.

ROBERT D. WEHR.

References Cited in the file of this patent

UNITED STATES PATENTS

| Number | Name | Date |
|---|---|---|
| 91,210 | Carter | June 15, 1869 |
| 1,049,614 | Sigler et al. | Jan. 7, 1913 |
| 2,108,488 | Johns | Feb. 15, 1938 |
| 2,183,743 | Hoefer | Dec. 19, 1939 |
| 2,444,203 | McKinnis | June 29, 1948 |
| 2,472,513 | Bergquist | June 7, 1949 |
| 2,500,648 | Sunseri | Mar. 14, 1950 |
| 2,515,772 | Hewlett | July 18, 1950 |
| 2,563,184 | Naylor | Aug. 7, 1951 |

FOREIGN PATENTS

| Number | Country | Date |
|---|---|---|
| 15,936 | Denmark | May 6, 1912 |
| 22,292 | Australia | Sept. 9, 1929 |
| 26,425 | Great Britain | of 1901 |
| 374,811 | Germany | Apr. 30, 1923 |